(12) United States Patent
Moorman

(10) Patent No.: US 11,021,146 B2
(45) Date of Patent: Jun. 1, 2021

(54) HYDRAULIC CONTROL CIRCUIT FOR A CLUTCH ACTUATOR AND COOLING OF A HYBRID-POWERTRAIN

(71) Applicant: GM Global Technology Operations LLC, Detroit, MI (US)

(72) Inventor: Steven P. Moorman, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 25 days.

(21) Appl. No.: 16/415,577

(22) Filed: May 17, 2019

(65) Prior Publication Data

US 2020/0361448 A1    Nov. 19, 2020

(51) Int. Cl.
| | | |
|---|---|---|
| B60W 20/50 | (2016.01) | |
| F16K 17/00 | (2006.01) | |
| F16H 61/02 | (2006.01) | |

(52) U.S. Cl.
CPC ......... *B60W 20/50* (2013.01); *F16H 61/0267* (2013.01); *F16K 17/003* (2013.01)

(58) Field of Classification Search
CPC .. F16K 17/003; B60W 20/50; F16H 61/0267; B62D 57/032
See application file for complete search history.

(56) References Cited

U.S. PATENT DOCUMENTS

2009/0084371 A1*  4/2009  Nibecker, Jr. ......... F41B 11/724
                                                              124/69

* cited by examiner

*Primary Examiner* — Abiy Teka
(74) *Attorney, Agent, or Firm* — Vivacqua Crane

(57) ABSTRACT

A hydraulic circuit for a hybrid powertrain having an engine and an electric motor. The hydraulic control circuit includes a first pressure regulating valve configured to cooperate with a shift valve for selectively communicating a hydraulic fluid to a hydraulic piston actuator of a clutch assembly for engaging the engine to a driveline. The hydraulic control circuit further includes a second pressure regulating valve configured to selectively communicate a flow of hydraulic fluid to a cooling circuit for the cooling of the electric motor and to cooperate with a check valve and the shift valve to actuate the hydraulic piston actuator during a predetermined fail mode of the first pressure regulating valve, thus providing a limp-home mode by coupling the torque output from the engine to driveline of the vehicle.

17 Claims, 5 Drawing Sheets

HYDRAULIC CONTROL CIRCUIT FOR A CLUTCH ACTUATOR AND COOLING OF A HYBRID-POWERTRAIN

INTRODUCTION

The present disclosure relates to hydraulic controls for powertrains of a hybrid-vehicles, more particularly to a hydraulic control of a hydraulic clutch actuator and cooling of a hybrid-powertrain system.

A hybrid-powertrain system for a vehicle typically includes an internal combustion engine (engine) and a high voltage electric motor arranged in series or in parallel. A transmission is provided with a clutch assembly for selectively delivering drive torque solely from the engine, solely from the electric motor, or from both the engine and electric motor to propel the vehicle. The clutch assembly may include a hydraulic actuator, such as a hydraulic piston, that is selectively actuated to engage a torque transmitting device, such as a multi-plate clutch pack, to couple the engine torque output to a driveline of the vehicle. The torque transmitting device is typically engaged, when the vehicle is propelled by either both the engine and electric motor, engine only, or when the motor is used to start the engine, such as during stop/start and engine only operations and launch assist operations, and disengaged when the vehicle is propelled only by the electric motor. Precise control of the clutch is required in order to couple the engine torque output to the driveline without noticeable disturbance felt by the vehicle occupants.

A hydraulic cooling control system is utilized to cool the electric motor to maintain desired motor efficiency and to cool the thermal energy generated by the actuation and modulation of the clutch assembly. A hydraulic fluid, such as a transmission fluid, is cycled through a cooling circuit to dissipate the thermal energy from the electric motor and clutch assembly. If a transmission fluid is used, the flow of the transmission fluid through the cooling circuit is controlled to prevent the reduction of the overall efficiency of the transmission due to the energy usage and the demand on the transmission fluid.

Hydraulic control circuits are utilized to control the actuation of the clutch assembly and cooling circuit flow. Thus, while known hydraulic control circuits achieve their intended purpose, there is a continual need for a simpler more elegant hydraulic control circuit.

SUMMARY

According to several aspects, a hydraulic control circuit for controlling a hydraulic actuator for a clutch assembly and a hydraulic cooling circuit is disclosed. The hydraulic circuit includes a first pressure regulating valve; a second pressure regulating valve; a shift valve in hydraulic communication with the first pressure regulating valve and the second regulating valve; and a check valve in hydraulic communication with the first pressure regulating valve, the second pressure regulating valve, and the shift valve. The first pressure regulating valve is configured to cooperate with the shift valve for selectively communicating a pressurized hydraulic fluid to the hydraulic actuator. The second pressure regulating valve is configured to selectively communicate a flow of hydraulic fluid to the cooling circuit, and to cooperate with the check valve and shift valve to communicate the pressurized hydraulic fluid to the hydraulic actuator during a predetermined fail mode of the hydraulic control circuit.

In an additional aspect of the present disclosure, the hydraulic control circuit further includes a first fluid pathway in hydraulic communications with a source of the pressurized hydraulic fluid, the first pressure regulating valve, the second pressure regulating valve, and the shift valve; a second fluid pathway in hydraulic communications with the shift valve; and a third fluid pathway in hydraulic communication with the cooling circuit, the second pressure regulating valve, and the check valve. The check valve is a two-way check valve configured to provide selective hydraulic communication between the first pressure regulating valve and the shift valve, and between the second pressure regulating valve and the shift valve.

The hydraulic control circuit further includes a fourth fluid pathway in hydraulic communications with first pressure regulating valve, the shift valve, and the 2-way check valve; and a fifth fluid pathway in hydraulic communications with first pressure regulator and the second pressure regulating valve.

In another aspect of the present disclosure, the first pressuring regulating valve comprises a first port, a second port, a third port, a fourth port, and a fifth port in fluid communication with a first internal first bore. The second pressuring regulating valve comprises a sixth port, a seventh port, an eighth port, a ninth port, and a tenth port in fluid communication with a second internal bore. The shift valve comprises an eleventh port, a twelfth port, a thirteenth port, and a fourteenth port in fluid communication with a third internal bore. The first fluid pathway in hydraulic communications with the first port of the first pressure regulating valve, the fourteenth port of the shift valve, and the sixth port of the second pressure regulating valve.

In another aspect of the present disclosure, the 2-way check valve includes a fifteenth port, a sixteenth port, and a seventeenth port. The third fluid pathway is in hydraulic communication with the sixteenth port of the two-way check valve and with the seventh port and eighth port of the second pressure regulating valve. The fourth fluid pathway is in hydraulic communications with the fifteenth port of the 2-way check valve, the second port of the first pressure regulating valve, and the twelfth port of the shift valve. The two-way check valve is operable to selectively seal the fifteenth port thus providing hydraulic communication between the sixteenth port and the seventeenth port, and is operable to selectively seal the sixteenth port thus providing hydraulic communication between the fifteenth port with the seventeenth port.

In another aspect of the present disclosure, the first pressuring regulating valve further includes a first valve stem having a first spool, a second spool, and a third spool slideable disposed within the first internal bore. A first fluid chamber is defined between the first spool and the second spool, and a second fluid chamber is defined between the second spool and the third spool. A first biasing member is disposed within the first internal bore urging the first valve stem in a first direction, such that the first port is in fluid communication with the second port and fourth port. A first electro-mechanical actuator is disposed against the third spool for selectively urging the first valve stem in a second direction opposite the first direction by overcoming the first biasing member, such that the first port is obstructed by the third spool.

In another aspect of the present disclosure, the second pressuring regulating valve further includes a second valve stem having a fourth spool, a fifth spool, and a sixth spool slideable disposed within the second internal bore. A third fluid chamber is defined between the fourth spool and the fifth spool, and a fourth fluid chamber is defined between the fifth spool and the sixth spool. A second biasing member is disposed within the second bore urging the second valve stem in a first direction, such that the sixth port is in fluid communication with the seventh port. A second electro-mechanical actuator disposed against the sixth spool for selectively urging the second valve stem in a second direction opposite the first direction by overcoming the second biasing member, such that the sixth port is obstructed by the sixth spool.

In another aspect of the present disclosure, the second electro-mechanical actuator includes a normally-low linear force second solenoid configured to apply a linear force proportionally to an applied electric current. The second solenoid is further configured to cease applying the linear force in the second direction when the second solenoid receives a signal indicating the first pressure regulating valve has failed in such a way that the third spool is obstructing the first port, thus allowing the second biasing member to shift the second valve stem in the first direction, such that the sixth port is in fluid communication with the seventh port.

In another aspect of the present disclosure, the check valve is a one-way check valve configured to provide selective hydraulic communication between the first pressure regulating valve and both the shift valve and second pressure regulating valve.

In another aspect of the present disclosure, the hydraulic control circuit further includes an orifice in a fluid pathway between the one-way check valve and the first pressure regulating valve According to several aspects, a hydraulic control circuit for a hybrid powertrain is disclosed. The hydraulic control circuit includes a first pressuring regulating valve having a first port, a second port, a third port, a fourth port, and a fifth port in fluid communication with a first internal first bore, and a first valve stem having a first spool, a second spool, and a third spool slideable disposed within the first internal bore, wherein a first fluid chamber is defined between the first spool and the second spool, and a second fluid chamber is defined between the second spool and the third spool. The hydraulic control circuit further includes a second pressuring regulating valve having a sixth port, a seventh port, an eighth port, a ninth port, and a tenth port in fluid communication with a second internal bore, and a second valve stem having a fourth spool, a fifth spool, and a sixth spool slideable disposed within the second internal bore, wherein a third fluid chamber 168 is defined between the fourth spool and the fifth spool, and a fourth fluid chamber is defined between the fifth spool and the sixth spool. The circuit still further includes a shift valve having an eleventh port, a tenth port, a thirteenth port, and a fourteenth port in fluid communication with a third internal bore, and a third valve stem having a seventh spool and an eighth spool slideable disposed within the third internal bore, wherein a fifth fluid chamber is defined between the seventh spool and the eighth spool. The circuit still further includes a two-way check valve comprising a fifteenth port, a sixteenth port, and a seventeenth port, wherein the two-way check valve is operable to selectively seal one of the fifteenth port and the sixteenth port, thus selectively providing hydraulic communication between the fifteenth port with the seventeenth port, and between the sixteenth port with the seventeenth port, and a network of hydraulic pathways interconnecting the first pressure regulating valve, the second regulating valve, the shift valve, and the two-way check valve.

In an additional aspect of the present disclosure, the network of hydraulic pathways includes: a first fluid pathway configured to provide hydraulic communications between a source of pressured hydraulic fluid and the first port of the first pressure regulating valve, the fourteenth port of the shift valve, and the sixth port of the second pressure regulating valve; a second fluid pathway configured to provide hydraulic communication between a hydraulic actuator and the eleventh port of the shift valve; a third fluid pathway configured to provide hydraulic communication between the cooling circuit 104, the sixteenth port of the two-way check valve, and the seventh port and sixth port of the second pressure regulating valve; a fourth fluid pathway configured to provide hydraulic communication between the second port of the first pressure regulating valve, the twelfth port of the shift valve, and the fifteenth port of the 2-way check valve; and a fifth fluid pathway configured to provide hydraulic communication between the third port of the first pressure regulating valve and the tenth port of the second pressure regulating valve.

In another aspect of the present disclosure, the first pressure regulating valve further includes a first biasing member is disposed within the first internal bore urging the first valve stem in a first direction, such that the first port is in fluid communication with the second port and third port; and a first electro-mechanical actuator disposed against the third spool for selectively urging the first valve stem in a second direction opposite the first direction by overcoming the first biasing member, such that the first port is obstructed by the third spool. The first electro-mechanical actuator includes a first solenoid configured to apply a linear force proportion to an applied current.

In another aspect of the present disclosure, the second pressure regulating valve further includes a second biasing member disposed within the second bore urging the second valve stem in a first direction, such that the sixth port is in fluid communication with the seventh port; and a second electro-mechanical actuator disposed against the sixth spool for selectively urging the second valve stem in a second direction opposite the first direction by overcoming the second biasing member, such that the sixth port is obstructed by the sixth spool. The second electro-mechanical actuator is configured to not urge the second valve stem in the second direction when the first pressure regulating valve fails in such a way that the first port is obstructed by the third spool.

In another aspect of the present disclosure, the first spool includes a first surface area A1 in communication with first fluid chamber and the second spool includes a second surface area A2 in fluid communication with the first chamber, wherein the second surface area A2 is less than the first surface area A1 of the first spool. The fourth spool includes a third surface area A3 in communication with third fluid chamber and the fifth spool includes a fourth surface area A4 in fluid communication with the third fluid chamber 168, wherein the fourth surface area A4 is less than the third surface area A3 of the fourth spool.

According to several aspects, a control circuit for a hybrid powertrain is disclosed. The circuit includes a first pressuring regulating valve having a first port, a second port, a third port, a fourth port, and a fifth port in fluid communication with a first internal first bore, and a first valve stem having a first spool, a second spool, and a third spool slideable disposed within the first internal bore. The first fluid chamber is defined between the first spool and the second spool, and a second fluid chamber is defined between the second spool and the third spool. The circuit further includes a second pressuring regulating valve having a sixth port, a seventh port, an eighth port, a ninth port, and a tenth port in fluid communication with a second internal bore, and a second valve stem having a fourth spool, a fifth spool, and a sixth spool slideable disposed within the second internal bore, wherein a third fluid chamber 168 is defined between the fourth spool and the fifth spool, and a fourth fluid chamber is defined between the fifth spool and the sixth spool. The circuit still further includes a shift valve having an eleventh port, a tenth port, a thirteenth port, a fourteenth port, and an eighteenth port in fluid communication with a third internal bore, and a third valve stem having a seventh spool and an eighth spool slideable disposed within the third internal bore, wherein a fifth fluid chamber is defined between the seventh spool and the eighth spool. The circuit still further includes a one-way check valve comprising an inlet port and an outlet port, wherein the one-way check valve is operable to selectively provide hydraulic communication between the first pressure regulating valve and both the shift valve and second pressure regulating valve; and a network of hydraulic pathways interconnecting the first pressure regulating valve, the second regulating valve, the shift valve, and the one-way check valve.

In an additional aspect of the present disclosure, the network of hydraulic pathways includes: a first fluid pathway configured to provide hydraulic communication between a source of pressurized hydraulic fluid and the first port of the first pressure regulating valve, the fourteenth port of the shift valve, and the sixth port of the second pressure regulating valve; a second fluid pathway configured to provide hydraulic communication between the hydraulic piston actuator and the second port of the first pressure regulating valve; a third fluid pathway configured to provide hydraulic communication between the cooling circuit, the seventh port and eighth port of the second pressure regulating valve, and the thirteenth port of the shift valve; a fourth fluid pathway configured to provide hydraulic communication between the third port of the first pressure regulating valve and the eleventh port of the shift valve; and a fifth fluid pathway configured to provide hydraulic communication between the tenth port of the second pressure regulating valve, the outlet port of the one-way check valve, and the twelfth port and eighteenth port of the shift valve; and a sixth fluid pathway configured to provide hydraulic communication between the inlet port of the one-way check valve and the fifth port of the first pressure regulating valve. The fifth fluid pathway is in hydraulic communication with the sixth fluid pathway via an orifice.

In another aspect of the present disclosure, the one-way check valve is biased in a closed position thus hydraulically separating the sixth fluid pathway from the fifth fluid pathway and is configured to transition to an open position upon a predetermined pressure different between the fifth fluid pathway with the sixth fluid pathway, when a pressure within the sixth fluid pathway exceeds a predetermined pressure.

In another aspect of the present disclosure, the eight spool of the shift valve includes a fifth surface area A5 in fluid communication with the thirteenth port for selectively receiving a sufficient hydraulic fluid from the third fluid pathway to urge the third valve stem in a second direction, opposite the first direction, to overcome the third biasing member for providing fluid communication between the eleventh port and twelve port via the fifth fluid chamber.

In another aspect of the present disclosure, the second pressure regulating valve is configured to provide hydraulic communication between the sixth port and seventh port via fourth fluid chamber upon the first pressure regulating valve failing in a predetermined mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Additionally, in the claims and specification, certain elements are designated as "first", "second", "third", etc. These are arbitrary designations intended to be consistent only in the section in which they appear (i.e. the specification or the claims or the summary) and are not necessarily consistent between the specification, the claims, and the summary. In that sense they are not intended to limit the elements in any way and a "second" element labeled as such in the claim may or may not refer to a "second" element labeled as such in the specification. Furthermore, for example, if a feature is indicated to have a "third" element, it is not implied or should it be inferred that the feature also includes a "first" and a "second" element. The terms "first", "second", "third", etc. are used to designate or name individual elements and are not necessarily used to represent or count the number of elements. Instead, the elements are distinguishable by their disposition, description, connections, and function.

Figure 1:
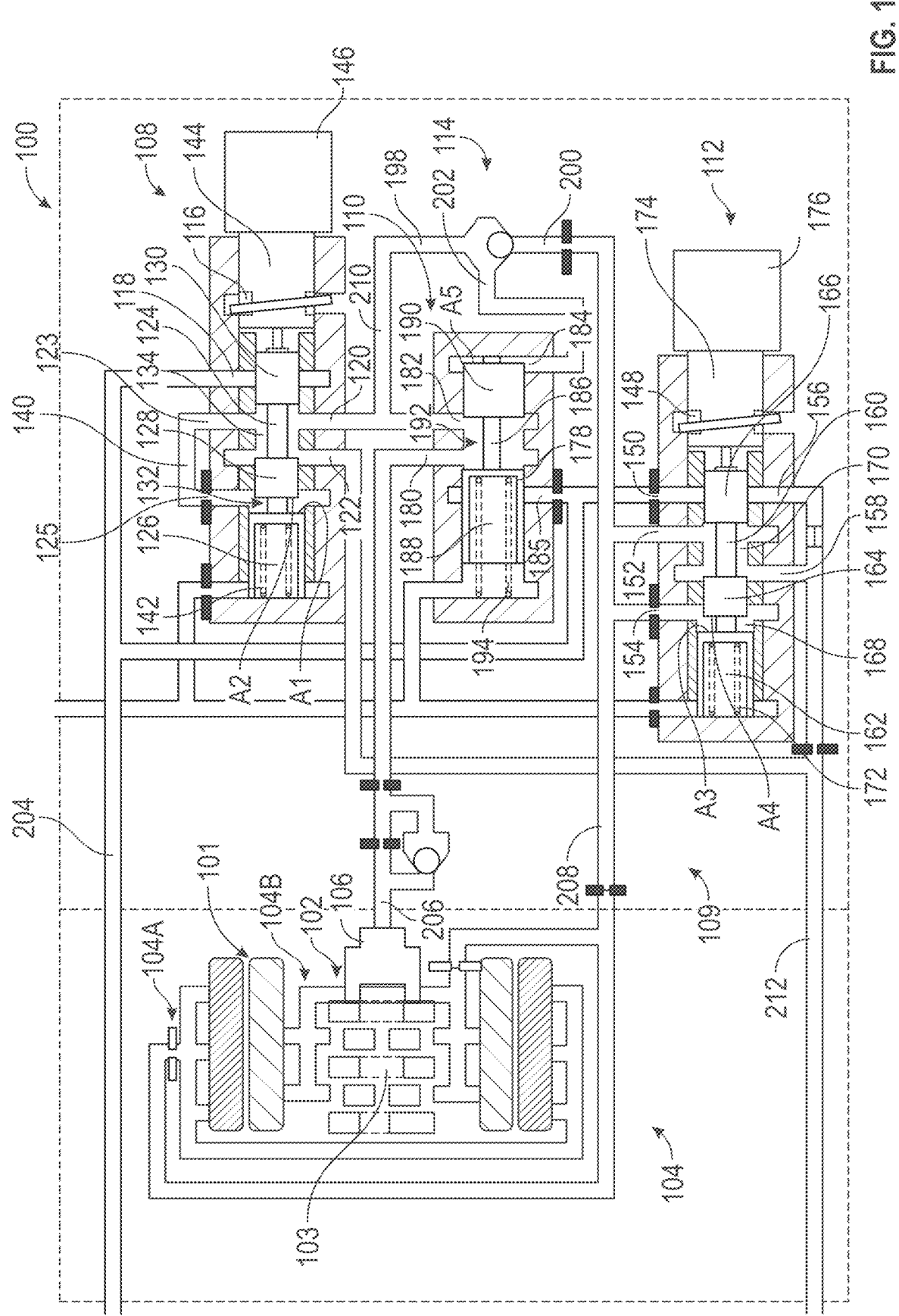
FIG. 1 is a schematic illustration of a hydraulic control circuit for a clutch and motor cooling of a hybrid vehicle in a first mode, according to a first exemplary embodiment.

Referring to FIG. 1, a first embodiment of a hydraulic control circuit for a hybrid powertrain is generally indicated by reference number 100. The hybrid powertrain includes an internal combustion engine (not shown) and a high voltage electric motor (motor) 101. A clutch assembly 102 is provided for selectively delivering drive torque from solely the internal combustion engine (engine), or from both the engine and motor 101 to propel the vehicle. A cooling circuit 104 is provided for selectively cooling of the clutch assembly 102 and electric motor 101. The hydraulic control circuit 100 is configured to provide hydraulic fluid communication to a clutch actuator 106 for the actuation of the clutch assembly 102 and to the cooling circuit 104 for the cooling of the clutch assembly 102 and electric motor 101. The hydraulic control circuit 100 is further configured to provide a fail-safe mode by actuating the clutch assembly 102 so that the vehicle may be propelled by at least the engine upon a predetermined failure mode of a component of the hydraulic control circuit 100.

The hydraulic control circuit 100 includes a network of fluid pathways, generally indicated by reference numeral 109, for communicating a hydraulic fluid, such as a transmission fluid, supplied by a pressurized hydraulic fluid source (not shown), such as a pump, to the hydraulic actuator 106 and to the cooling circuit 104. The clutch assembly 102 includes a multi-plate clutch pack 103 configured to couple the torque output of the engine to a driveline of the vehicle. The hydraulic actuator 106 may be that of a hydraulic piston 106 configured to receive a pressurized hydraulic fluid to modulate and lock the multi-plate clutch pack 103. The cooling circuit 104 includes a first cooling circuit 104A adapted to provide cooling to the motor 101 and a second cooling circuit 104B adapted to provide cooling to the clutch assembly.

The hydraulic control circuit 100 includes a first pressure regulating valve 108 configured to cooperate with a shift valve 110, also referred to as a boost valve 110, to selectively communicate the transmission fluid to the hydraulic piston actuator 106 of the clutch assembly 102. The hydraulic control circuit 100 further includes a second pressure regulating valve 112 configured to selectively communicate a flow of transmission fluid to the cooling circuit 104 and to cooperate with a three-port check valve 114 and shift valve 110 to actuate the hydraulic piston actuator during a predetermined fail mode of the first pressure regulating valve 108 of the hydraulic control circuit 100, thus providing a limp-home mode by coupling the torque output from the engine to driveline of the vehicle.

The first pressure regulating valve 108, also referred to as the clutch valve 108, includes an interior surface defining a first internal bore 116 and includes a first port 118, a second port 120, a third port 122, a fourth port 123, and a fifth port 125 in fluid communication with the first internal bore 116. A first valve stem 124 having a first spool 126, a second spool 128, and a third spool 130 is slideable disposed within the first internal bore 116. A first fluid chamber 132 is defined between the first spool 126 and the second spool 128, and a second fluid chamber 134 is defined between the second spool 128 and the third spool 130. The first spool 126 includes a first surface area A1 in communication with first fluid chamber 132 and the second spool 128 includes a second surface area A2, which is less than the first surface area A1 of the first spool 126, in fluid communication with the first fluid chamber 132. A fluid equalization pathway 140 is in fluid communication with the fourth port 123 and the fifth port 125, thereby providing fluid communication between the first fluid chamber 132 and the second fluid chamber 134.

A first biasing member 142 is disposed within the first internal bore 116 urging the first valve stem 124 in a first direction, shown as toward the right of FIG. 1. The first biasing member 142 may be that of a coiled spring having a predetermined spring constant under compression. A first electro-mechanical actuator 144 is disposed against the third spool 130 for selectively urging the first valve stem 124 in a second direction, opposite the first direction, by overcoming the biasing force of the first biasing member 142. The first electro-mechanical actuator 144 includes a normally-low linear force first solenoid 146 adapted to apply a linear force proportionally to an applied electric current or voltage received from a transmission control module (not shown). A normally-low linear force solenoid is one where in an absence of an applied current, the solenoid applies a zero force (i.e. negligible to no applied force). In the current example, in an absence of an applied current, the first biasing member urges the first valve stem 124 in the first direction without a counter force urging the first valve stem 124 in the second direction.

The first electro-mechanical actuator 144 cooperates with the biasing member to slideably move the valve stem in the first direction and in the opposite second direction such that the second port 120 is in selective fluid communication with the first port 118 or third port 122 via the second fluid chamber 134.

The second pressure regulating valve 112, also referred to as the cooling circuit valve 112, includes an interior surface defining a second internal bore 148 and includes a sixth port 150, a seventh port 152, an eighth port 154, a ninth port 156, and a tenth port 158 in fluid communication with the second internal bore 148. A second valve stem 160 having a fourth spool 162, a fifth spool 164, and a sixth spool 166 is slideable disposed within the second internal bore 148. A third fluid chamber 168 is defined between the fourth spool 162 and the fifth spool 164, and a fourth fluid chamber 170 is defined between the fifth spool 164 and the sixth spool 166. The fourth spool 162 includes a third surface area A3 in communication with third fluid chamber 168 and the fifth spool 164 includes a fourth surface area A4, which is less than the third surface area A3 of the fourth spool 162, in fluid communication with the third fluid chamber 168.

A second biasing member 172 is disposed within the second bore urging the second valve stem 160 in a first direction. The second biasing member 172 may be that of a coiled spring having a predetermined spring constant under compression. A second electro-mechanical actuator 174 is disposed against the sixth spool 166 for selectively urging the second valve stem 160 in a second direction toward the second biasing member 172, opposite the first direction, by overcoming the biasing force of the second biasing member 172. The second electro-mechanical actuator 174 includes a normally-low linear force second solenoid 176 adapted to apply a linear force against the sixth spool 166 proportionally to an applied electric current or voltage received from a control module. The second electro-mechanical actuator 174 cooperates with the second biasing member 172 to slideably move the second valve stem 160 in the first direction and in the opposite second direction such that seventh port 152 is in selective fluid communication with the sixth port 150 or the tenth port 158 via the fourth fluid chamber 170. The seventh port 152 and the sixth port 154 are in fluid communication thus equalizing the pressure between the third fluid chamber 168 and fourth fluid chamber 170.

The shift valve 110 includes an internal surface defining a third internal bore 178 and an eleventh port 180, a twelfth port 182, a thirteenth port 184, and a fourteenth port 185. A third valve stem 186 having a seventh spool 188 and an eighth spool 190 is slideable disposed within the third internal bore 178. A fifth fluid chamber 192 is defined between the seventh spool 188 and the eighth spool 190. A third biasing member 194 is disposed within the third internal bore 178 urging the third valve stem 186 in a first direction. The third biasing member 194 may be that of a coiled spring have a predetermined spring constant under compression. The eight spool includes a fifth surface area A5 in fluid communication with the thirteenth port 184 for receiving a pressurized hydraulic fluid to urge the third valve stem 186 in a second direction, opposite the first direction, to overcome the third biasing member 194 for selectively providing fluid communication between the eleventh port 180 and twelfth port 182 via the fifth fluid chamber 192, and for selectively providing fluid communication between the eleventh port 180 and fourteenth port 185 via the fifth fluid chamber 192.

The hydraulic control circuit 100 includes the three-port two-way check valve 114 having a fifteenth port 198, a sixteenth port 200, and a seventeenth port 202. The two-way check valve 114 is operable to selectively seal the fifteenth port 198 and the sixteenth port 200, thus providing hydraulic communication between the fifteenth port 198 with the seventeenth port 202 and between the sixteenth port 200 with the seventeenth port 202.

The hydraulic control circuit 100 includes a first fluid pathway 204, a second fluid pathway 206, a third fluid pathway 208, a fourth fluid pathway 210, and a fifth fluid pathway 212. The first fluid pathway 204 provides hydraulic communication between a source of pressurized transmission fluid (not shown) and the first port 118 of the first pressure regulating valve 108, the fourteenth port 185 of the shift valve 110, and the sixth port 150 and ninth port 156 of the second pressure regulating valve 112. The second fluid pathway 206 provides hydraulic communication between the hydraulic piston actuator 106 and the eleventh port 180 of the shift valve 110. The third fluid pathway 208 provides hydraulic communication between the cooling circuit 104 and the sixteenth port 200 of the two-way check valve 114 and the seventh port 152 and sixth port 154 of the second pressure regulating valve 112. The fourth fluid pathway 210 provides hydraulic communication between the second port 120 of the first pressure regulating valve 108, the twelfth port 182 of the shift valve 110, and the fifteenth port 198 of the 2-way check valve 114. The fifth fluid pathway 212 provides hydraulic communication between the third port 122 of the first pressure regulating valve 108 and tenth port 158 of the second pressure regulating valve 112.

The first and second electro-mechanical actuators 144, 174 for the first pressure regulating valve 108 and second pressure regulating valve 112 may be operated by a control current or voltage sent from a transmission control module (not shown). The transmission control module is preferably an electronic control device having a preprogrammed digital computer or processor, control logic, memory used to store data, and at least one I/O peripheral. The control logic includes a plurality of logic routines for monitoring, manipulating, and generating data. The control module controls the actuation of the hydraulic actuator and cooling system via selective actuation of the first pressure regulating valve 108 and second pressure regulating valve 112 of the hydraulic control system according to the principles of the present disclosure.

Still referring to FIG. 1, the first pressure regulating valve 108 is shown in a first mode resulting in a disengaged clutch assembly. A first, relatively large electric current is applied to the first solenoid 146 thus causing the first electro-mechanical actuator 144 to overcome the biasing force of the first biasing member 142. The first electro-mechanical actuator 144 slideably moves the valve stem in the second direction such that the third spool 130 obstructs or seals the first port 118, thus preventing hydraulic communication between the first port 118 and the shift valve 110 resulting in minimal to no pressurized transmission fluid acting on the piston actuator 106, resulting in a disengaged clutch assembly.

Figure 2:
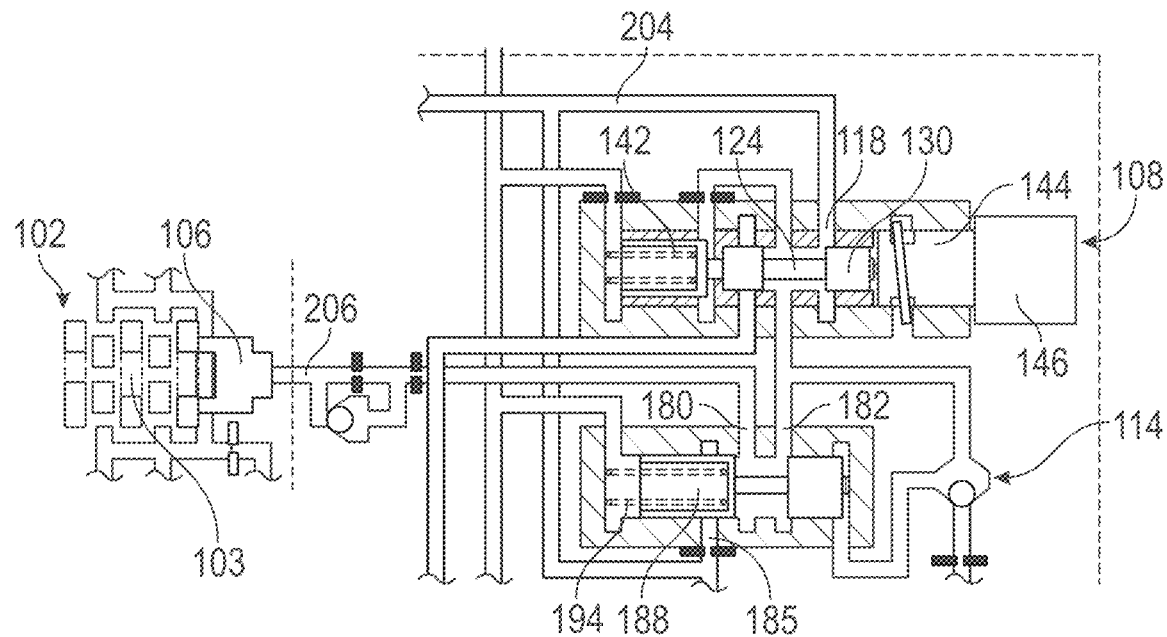
FIG. 2 is a schematic illustration of a clutch valve and boost valve of FIG. 1 in a second mode, according to an exemplary embodiment.

Referring to FIG. 2, the first pressure regulating valve 108 is shown in a second mode resulting in a modulation or transition of the clutch assembly 102 between the fully engaged and non-engaged position. A second electric current, which is smaller than the first electric current, is applied to the first solenoid 146, thus proportionally decreasing the force the first electro-mechanical actuator 144 applies to overcome the biasing force of the first biasing member 142. The first electro-mechanical actuator 144 slideably moves the first valve stem 124 in the second direction such that the third spool 130 partially unseal the first port 118 resulting in a lower pressurized transmission fluid in the second fluid pathway 206, relative to the higher pressurized transmission fluid in the first fluid pathway 204, acting on the piston actuator 106.

Figure 3:
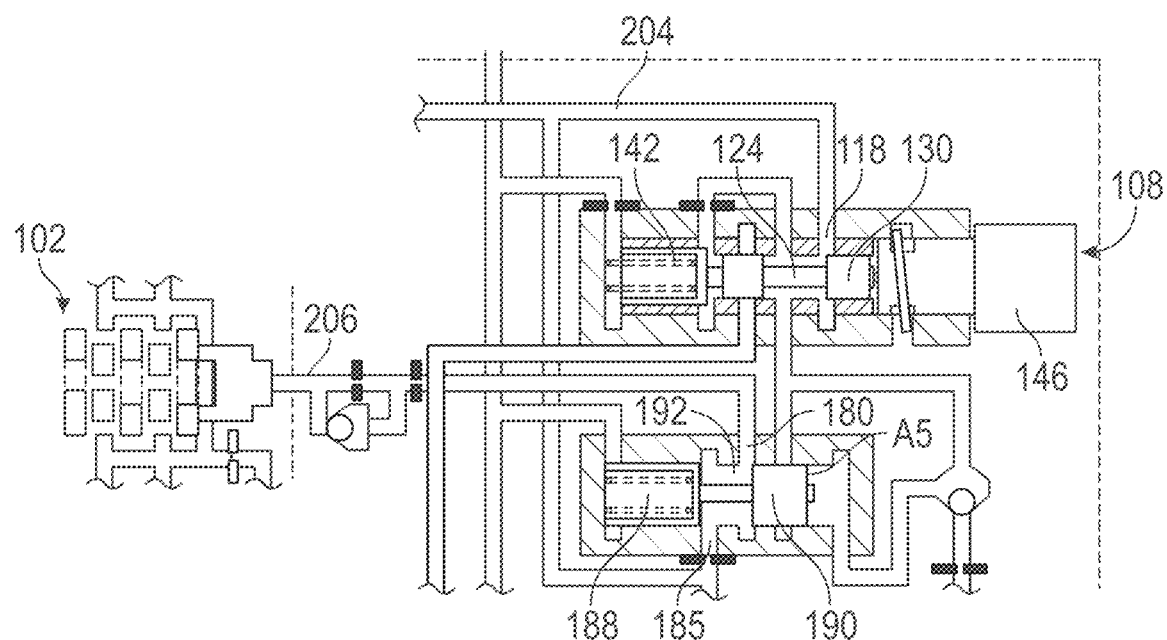
FIG. 3 is a schematic illustration of the clutch valve and boost valve of FIG. 1 in a third mode, according to an exemplary embodiment.

Referring to FIG. 3, the first pressure regulating valve 108 is shown in a third mode resulting in a fully engaged, or locking, of the clutch assembly 102. A third electric current, which is less than the second electric current to zero current, is applied to the first solenoid 146 such that the third spool 130 further un-obstruct the first port 118 thus increasing the pressure of the hydraulic fluid applied to the fifth surface area A5 of the eighth spool 190 via the check valve 114 to overcome the third biasing spring to slideably move the third valve stem 186 in the second direct. As the third valve stem 186 is moved in the second direction, the seventh spool 188 unseals the fourteenth port 185 such that hydraulic communication is provided between the first fluid pathway 204 and second pathway 206 via the fourteenth port 185, fifth fluid chamber 192, and eleventh port 180.

Figure 4:
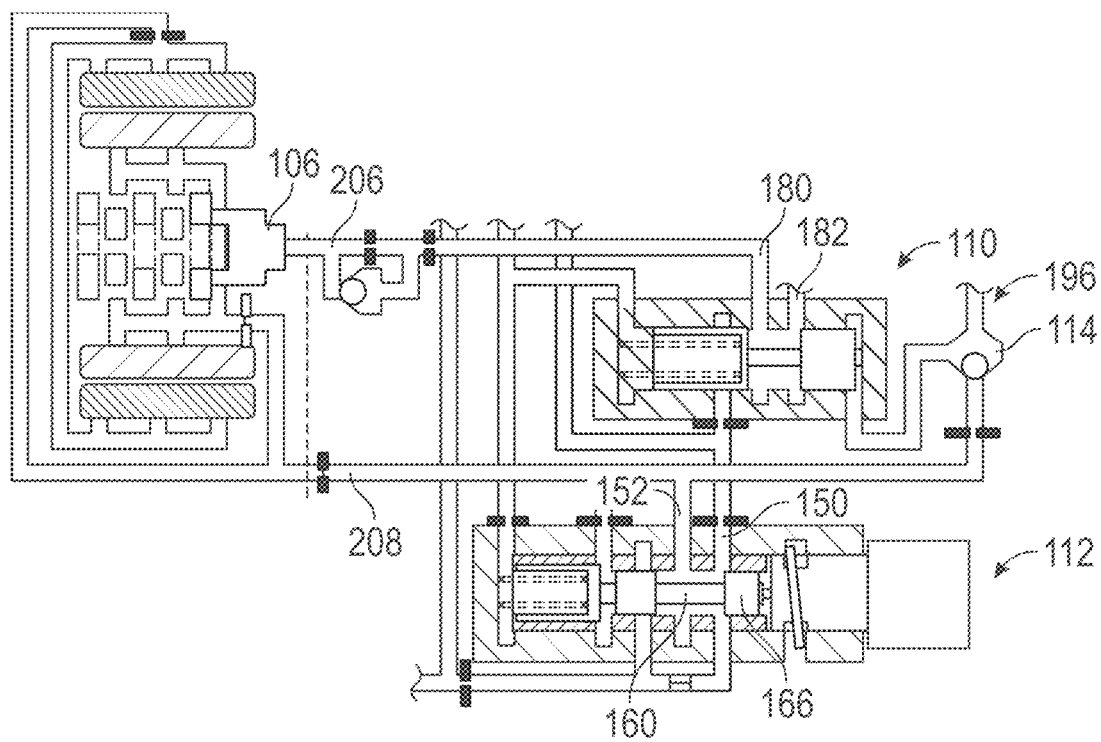
FIG. 4 is a schematic illustration of a cooling valve and boost valve of FIG. 1 in a second mode, according to an exemplary embodiment according to an exemplary embodiment.

Referring back to FIG. 1, the second pressure regulating valve 112 is shown in a first mode, fully energized, resulting in the second valve stem 160 slideably moved in the second direction such that the sixth spool 166 obstructs the sixth port 150 thus minimizing fluid flow to the cooling circuit 104. Referring to FIG. 4, the second pressure regulating valve 112 is shown in a second mode, partially energized, where the electric current to the second solenoid 176 is reduced. In the second mode, the second biasing member 172 cooperates with the second electro-mechanical actuator 174 to slideably move the second valve stem 160 in the first direction resulting in the six spool 166 partially un-obstructing the sixth port 150, thus allowing the sixth port 150 to communicate with the third fluid pathway 208 via the fourth fluid chamber 170 and providing hydraulic fluid to the cooling circuit 104.

Figure 5:
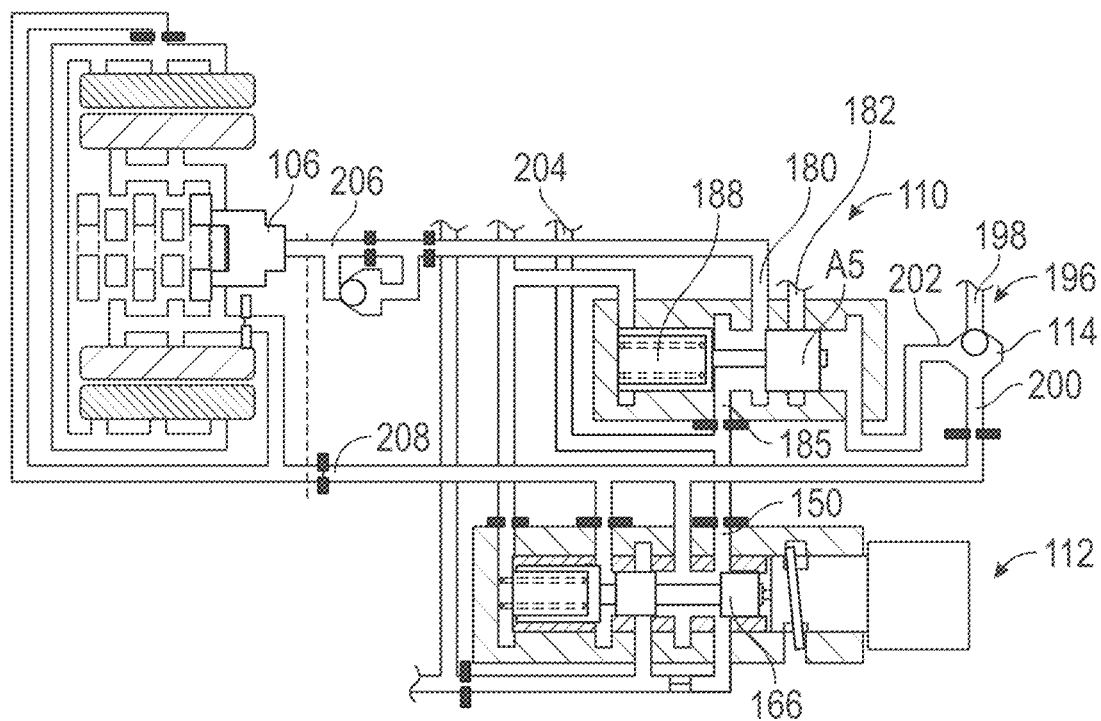
FIG. 5 is a schematic illustration of the cooling valve and boost mode of FIG. 1 when the clutch valve fails in a predetermined state, according to an exemplary embodiment.

Referring to FIG. 5, the second pressure regulating valve 112 is shown in a third mode, de-energized, where the electric current to the second solenoid 176 is further reduced or eliminated causing the second valve stem 160 to shift fully to the first direction. The second pressure regulating valve 112 is placed in the third mode by the transmission control module after determining the first pressure regulating valve 108 is stuck in the first mode, where the third spool 130 obstructs or seals the first port 118. With the sixth spool 166 further un-obstructing the sixth port 150, the pressure in the third fluid pathway 208 is increased urging the check valve 114 to seal the fifteenth port 198, thus hydraulically communicating the sixteenth port 200 with the seventeenth port 202. The hydraulic fluid enters the seventeenth port 202 and acts on the fifth surface area A5 thus shifting the third valve stem 186 toward the second direction and moving the seventh spool 188 to unseal the fourteenth port 185. This results in the first fluid path 204 coming in communication with the second fluid path 206 via the shift valve 110, thus proving sufficient hydraulic fluid to the hydraulic actuator 106 to lock the clutch assembly 102.

Figure 6:
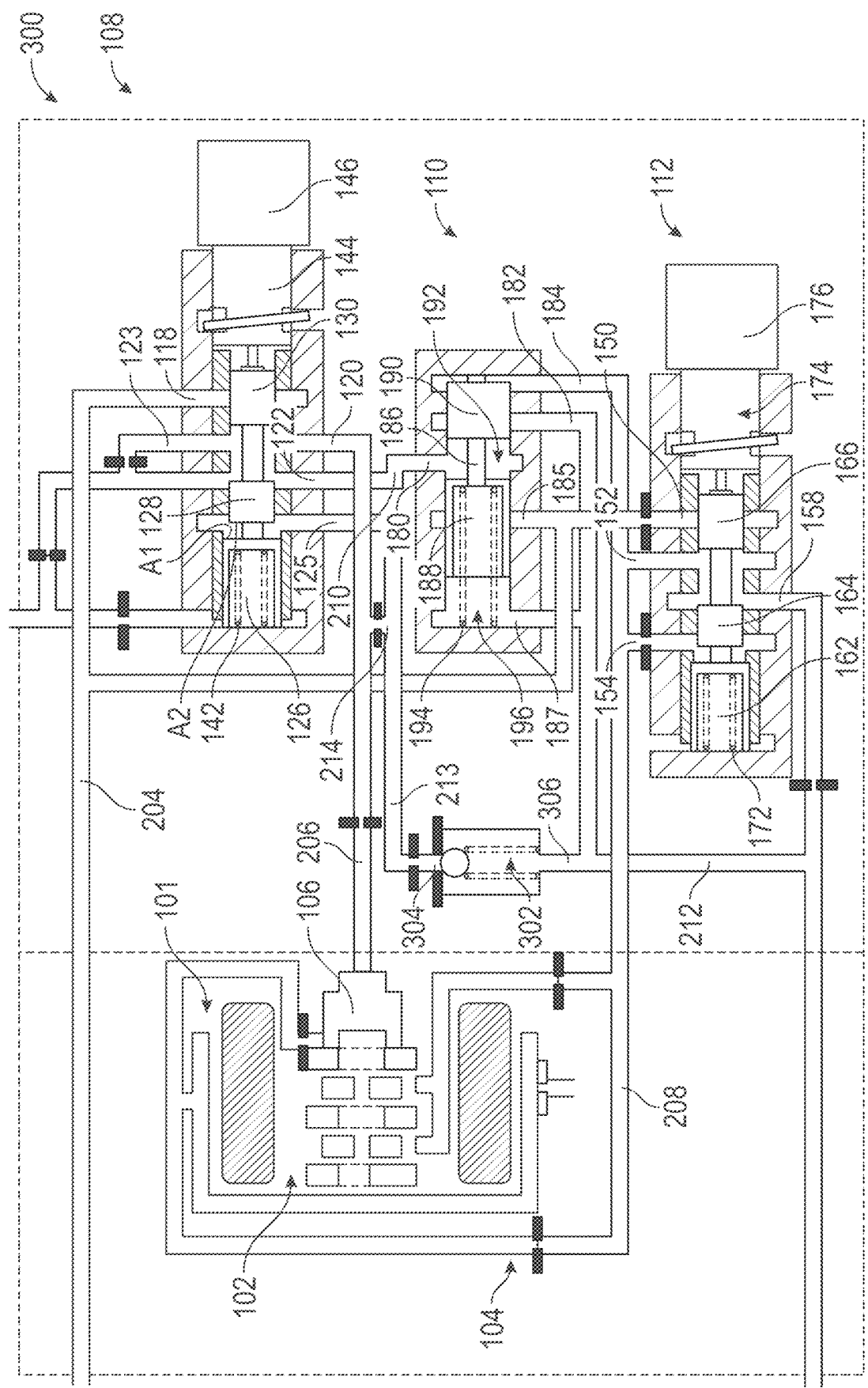
FIG. 6 is a schematic illustration of an integrated hydraulic control circuit for a clutch and motor cooling of a hybrid vehicle, according to a second exemplary embodiment.

Referring to FIG. 6, a second exemplary embodiment of a hydraulic control circuit for a hybrid powertrain is generally indicated by reference number 300. The hydraulic control circuit 300 is configured to provide hydraulic fluid communication to a clutch actuator 106 for the actuation of a clutch assembly 102 and to a cooling circuit 104 for the cooling of the clutch assembly 102 and electric motor 101. The hydraulic control circuit 300 is further configured to provide a fail-safe mode by actuating the clutch assembly 102 so that the vehicle may be propelled by at least the engine upon a predetermined failure mode. The hydraulic control circuit 300 includes a first pressure regulating valve 108, a second pressure regulating valve 112, and a one-way check valve 302 having an inlet port 304 and an outlet port 306.

The first pressure regulating valve 108 includes a first port 118, a second port 120, a third port 122, a fourth port 123, and a fifth port 125 in fluid communication with a first internal bore 116. A first valve stem 124 having a first spool 126, a second spool 128, and a third spool 130 is slideable disposed within the first internal bore 116. A first fluid chamber 132 is defined between the first spool 126 and the second spool 128, and a second fluid chamber 134 is defined between the second spool 128 and the third spool 130. The first spool 126 includes a first surface area A1 in communication with first fluid chamber 132 and the second spool 128 includes a second surface area A2, which is less than the first surface area of the first spool 126, in fluid communication with the first chamber.

A first biasing member 142 is disposed within the first internal bore 116 urging the first valve stem 124 in a first direction. A first electro-mechanical actuator 144 is disposed against the third spool 130 for selectively urging the first valve stem 124 in a second direction, opposite the first direction. The first electro-mechanical actuator 144 cooperates with the biasing member to slideably move the valve stem in the first direction and in the opposite second direction such that the second port 120 is in selective fluid communication with the first port 118 and third port 122 via the second fluid chamber 134.

The second pressure regulating valve 112 includes a sixth port 150, a seventh port 152, an eighth port 154, and a tenth port 158 in fluid communication with a second internal bore 148. A second valve stem 160 having a fourth spool 162, a fifth spool 164, and a sixth spool 166 is slideable disposed within the second internal bore 148. A third fluid chamber 168 is defined between the fourth spool 162 and the fifth spool 164, and a fourth fluid chamber 170 is defined between the fifth spool 164 and the sixth spool 166. The fourth spool 162 includes a third surface area A3 in communication with third fluid chamber 168 and the fifth spool 164 includes a fourth surface area A4, which is less than the third surface area of the fourth spool 162, in fluid communication with the third fluid chamber 168.

A second biasing member 172 is disposed within the second bore urging the second valve stem 160 in a first direction. A second electro-mechanical actuator 174 is disposed against the sixth spool 166 for selectively urging the second valve stem 160 in a second direction toward the second biasing member 172, opposite the first direction. The second electro-mechanical actuator 174 cooperates with the second biasing member 172 to slideably move the valve stem in the first direction and in the opposite second direction such that the sixth port 150 is in selective fluid communication with the seventh port 152 via the fourth fluid chamber 170. The seventh port 152 and the sixth port 154 are in fluid communication thus equalizing the pressure between the third fluid chamber 168 and fourth fluid chamber 170.

The first and second electro-mechanical actuators 144, 174 include a normally-low linear force second solenoid adapted to apply a linear force proportionally to an applied electric current or voltage received from a transmission control module. The transmission control module is preferably an electronic control device having a preprogrammed digital computer or processor, control logic, memory used to store data, and at least one I/O peripheral. The control logic includes a plurality of logic routines for monitoring, manipulating, and generating data. The control module controls the actuation of the hydraulic actuator and cooling system via selective actuation of the first pressure regulating valve 108 and second pressure regulating valve 112 of the hydraulic control system according to the principles of the present disclosure.

The shift valve 110 includes an internal surface defining a third internal bore 178 and an eleventh port 180, a twelfth port 182, a thirteenth port 184, a fourteenth port 185, and an eighteenth port 187. A third valve stem 186 having a seventh spool 188 and an eighth spool 190 is slideable disposed within the third internal bore 178. A fifth fluid chamber 192 is defined between the seventh spool 188 and the eighth spool 190. A sixth fluid chamber 196 is defined between the seventh spool 188 and a rear portion of the internal surface. A third biasing member 194 is disposed within the third bore urging the third valve stem 186 in a first direction.

The hydraulic control circuit 100 includes a first fluid pathway 204, a second fluid pathway 206, a third fluid pathway 208, a fourth fluid pathway 210, a fifth fluid pathway 212, and a sixth fluid pathway 213. The first fluid pathway 204 provides hydraulic communication between a source of pressurized transmission fluid (not shown) and the first port 118 of the first pressure regulating valve 108, the fourteenth port 185 of the shift valve 110, and the sixth port 150 of the second pressure regulating valve 112. The second fluid pathway 206 provides hydraulic communication between the hydraulic piston actuator 106 and the second port 120 of the first pressure regulating valve 108. The third fluid pathway 208 provides hydraulic communication between the cooling circuit 104, the seventh port 152 and eighth port 154 of the second pressure regulating valve 112, and the thirteenth port 184 of the shift valve 110. The fourth fluid pathway 210 provides hydraulic communication between the third port 122 of the first pressure regulating valve 108 and the eleventh port 180 of the shift valve 110. The fifth fluid pathway 212 provides hydraulic communication between the tenth port 158 of the second pressure regulating valve 112, the outlet port 306 of the one-way check valve, and the twelfth port 182 and fifteen port 187 of the shift valve 110. The sixth fluid pathway 213 provides hydraulic communication between the inlet port 304 of the check valve 302 and the fifth port 125 of the first pressure regulating valve 108. The sixth fluid pathway 213 is in hydraulic communications with the second fluid pathway 206 via an orifice 214 located between the inlet 304 and port 125 of the sixth fluid pathway 213, and between the piston actuator and port 120 of the second fluid pathway 206.

The eight spool of the shift valve 110 includes a fifth surface area A5 in fluid communication with the thirteenth port 184 for selectively receiving a sufficient hydraulic fluid from the third fluid pathway 208 to urge the third valve stem 186 in a second direction, opposite the first direction, to overcome the third biasing member 194 for providing fluid communication between the eleventh port 180 and twelve port 185 via the fifth fluid chamber 192.

The one-way check valve is provided interconnecting the fifth fluid pathway 212 with the sixth fluid pathway 213. The one-way check valve is biased in a closed position thus hydraulically separating the fifth fluid pathway 212 from the sixth fluid pathway 213. The one-way check valve is configured to open upon a predetermined pressure different between the fifth fluid pathway 212 with the sixth fluid pathway 213, in which the hydraulic pressure within the fifth fluid pathway 213 is greater than the hydraulic pressure within the fifth fluid pathway 212.

Still referring to FIG. 6, the first pressure regulating valve 108 is shown in a first mode resulting in a disengaged clutch assembly. A first, relatively large electric current is applied to the first solenoid 146 thus causing the first electro-mechanical actuator 144 to overcome the biasing force of the first biasing member 142. The first electro-mechanical actuator 144 slideably moves the first valve stem in the second direction such that the third spool 130 obstructs or seals the first port 118, thus preventing hydraulic communication between the first port 118 and second port 120 resulting in minimal to no pressurized transmission fluid acting on the piston actuator 106 and a disengaged clutch assembly.

Figure 7:
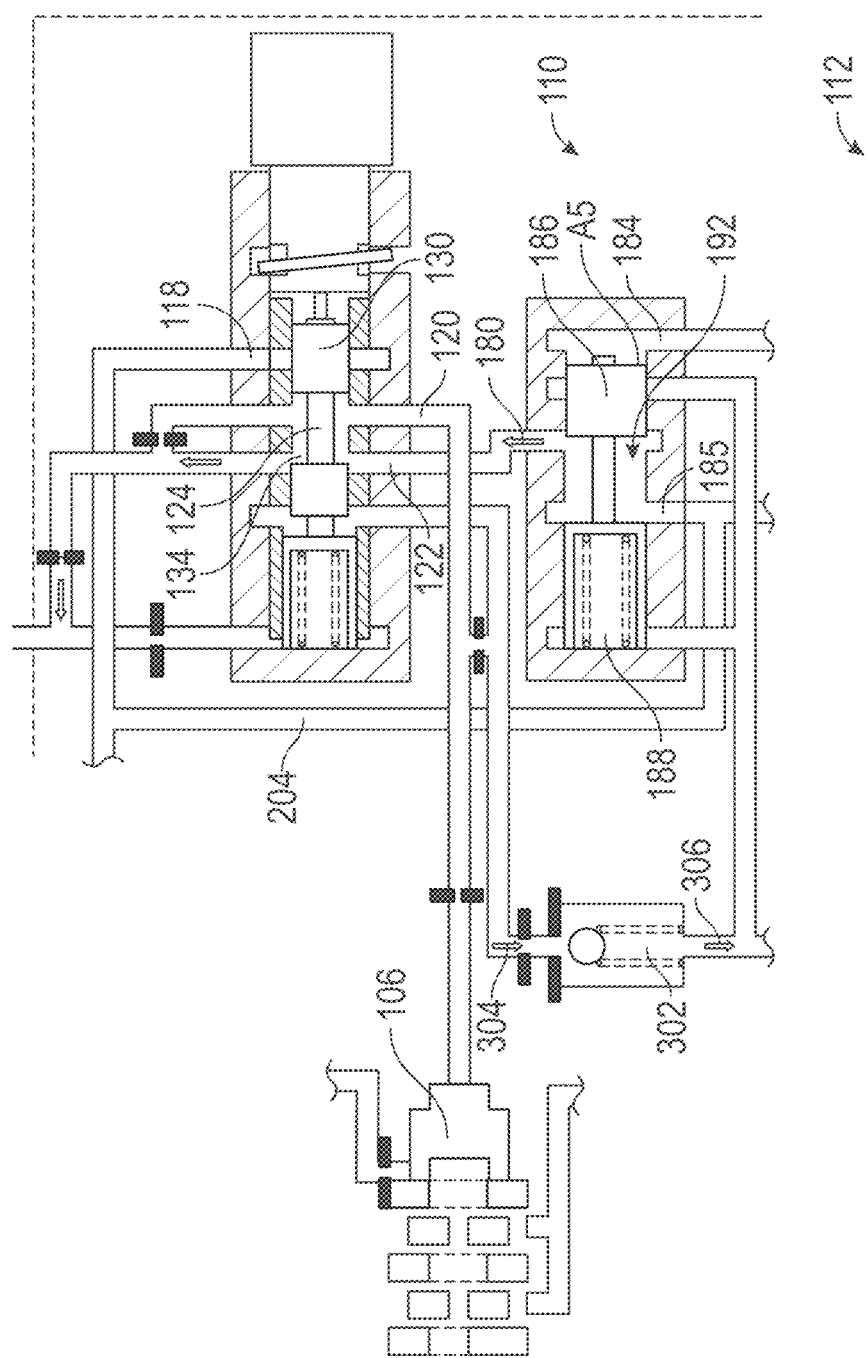
FIG. 7 is a schematic illustration of the clutch valve and shift valve of FIG. 2 in a boost mode.

Referring to FIG. 7, the first pressure regulating valve 108 is shown in a predetermined failure mode where the first valve stem 124 is stuck in the second direction such that the third spool 130 obstructs or seals the first port 118, thus preventing hydraulic communication between the first port 118 and hydraulic actuator 106. Upon detecting this failure mode, the transmission control module de-energizes the second electro-mechanical actuator of the second pressure regulating valve, thus allowing the second biasing member to urge the second valve stem in the first direction so that the sixth port 150 is in fluid communication with the seventh port 152 via the fourth fluid chamber 170. The seventh port 152 is in hydraulic communication with the thirteenth port 184 of the shift valve 110 via the third fluid pathway 208 and the hydraulic fluid acts on the fifth surface area A5 thus shifting the third valve stem 186 toward the second direction and moving the seventh spool 188 to unseal the fourteenth port 185. This results in the pressurized hydraulic fluid from the first fluid pathway 204 entering the fourteenth port 185 of the shift valve 110, through the fifth fluid chamber 192, and exits the eleventh port 180 of the shift valve 110. The pressurized hydraulic fluid then enters the a third port 122 of the first pressure regulating valve, through the second fluid chamber 134, and exits the second port 120 of the pressure regulating valve into the second fluid path 206 toward the hydraulic actuator 106. The increase in pressure within the second fluid path 206 opens the one-way check valve 302 thus supplying additional hydraulic fluid to the second pressure regulating valve.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A hydraulic control circuit for controlling a hydraulic actuator for a clutch assembly and a hydraulic cooling circuit, comprising:
   a first pressure regulating valve;
   a second pressure regulating valve;
   a shift valve in hydraulic communication with the first pressure regulating valve and the second regulating valve; and
   a check valve in hydraulic communication with the first pressure regulating valve, the second pressure regulating valve, and the shift valve;
   a first fluid pathway in hydraulic communications with a source of a pressurized hydraulic fluid, the first pressure regulating valve, the second pressure regulating valve, and the shift valve;
   a second fluid pathway in hydraulic communications with the shift valve; and
   a third fluid pathway in hydraulic communication with the cooling circuit, the second pressure regulating valve, and the check valve;
   wherein the first pressure regulating valve is configured to cooperate with the shift valve for selectively communicating a pressurized hydraulic fluid to the hydraulic actuator,
   wherein the second pressure regulating valve is configured to selectively communicate a flow of hydraulic fluid to the cooling circuit, and to cooperate with the check valve and shift valve to communicate the pressurized hydraulic fluid to the hydraulic actuator during a predetermined fail mode of the hydraulic control circuit, and
   wherein the check valve is a two-way check valve configured to provide selective hydraulic communication between the first pressure regulating valve and the shift valve, and between the second pressure regulating valve and the shift valve.

2. The hydraulic control circuit of claim 1, further comprising:
   a fourth fluid pathway in hydraulic communications with the first pressure regulating valve, the shift valve, and the 2-way check valve; and
   a fifth fluid pathway in hydraulic communications with the first pressure regulator and the second pressure regulating valve.

3. The hydraulic control circuit of claim 2, wherein:
   the first pressuring regulating valve comprises a first port, a second port, a third port, a fourth port, and a fifth port in fluid communication with a first internal first bore;
   the second pressuring regulating valve comprises a sixth port, a seventh port, an eighth port, a ninth port, and a tenth port in fluid communication with a second internal bore;
   the shift valve comprises an eleventh port, a twelfth port, a thirteenth port, and a fourteenth port in fluid communication with a third internal bore;
   wherein the first fluid pathway in hydraulic communications with the first port of the first pressure regulating valve, the fourteenth port of the shift valve, and the sixth port of the second pressure regulating valve.

4. The hydraulic control circuit of claim 3, wherein:
the 2-way check valve comprises a fifteenth port, a sixteenth port, and a seventeenth port;
the third fluid pathway is in hydraulic communication with the sixteenth port of the two-way check valve and with the seventh port and eighth port of the second pressure regulating valve; and
the fourth fluid pathway is in hydraulic communications with the fifteenth port of the 2-way check valve, the second port of the first pressure regulating valve, and the twelfth port of the shift valve;
wherein the two-way check valve is operable to selectively seal the fifteenth port thus providing hydraulic communication between the sixteenth port and the seventeenth port, and is operable to selectively seal the sixteenth port thus providing hydraulic communication between the fifteenth port with the seventeenth port.

5. The hydraulic control circuit of claim 4, wherein the first pressuring regulating valve further comprises:
a first valve stem having a first spool, a second spool, and a third spool slidingly disposed within the first internal bore, wherein a first fluid chamber is defined between the first spool and the second spool, and a second fluid chamber is defined between the second spool and the third spool;
a first biasing member is disposed within the first internal bore urging the first valve stem in a first direction, such that the first port is in fluid communication with the second port and fourth port; and
a first electro-mechanical actuator is disposed against the third spool for selectively urging the first valve stem in a second direction opposite the first direction by overcoming the first biasing member, such that the first port is obstructed by the third spool.

6. The hydraulic control circuit of claim 5, wherein the second pressuring regulating valve further comprises:
a second valve stem having a fourth spool, a fifth spool, and a sixth spool slidingly disposed within the second internal bore, wherein a third fluid chamber is defined between the fourth spool and the fifth spool, and a fourth fluid chamber is defined between the fifth spool and the sixth spool;
a second biasing member is disposed within the second bore urging the second valve stem in a first direction, such that the sixth port is in fluid communication with the seventh port; and
a second electro-mechanical actuator disposed against the sixth spool for selectively urging the second valve stem in a second direction opposite the first direction by overcoming the second biasing member, such that the sixth port is obstructed by the sixth spool.

7. The hydraulic control circuit of claim 6, wherein:
the second electro-mechanical actuator includes a normally-low linear force second solenoid configured to apply a linear force proportionally to an applied electric current; and
the second solenoid is further configured to cease applying the linear force in the second direction when the second solenoid receives a signal indicating the first pressure regulating valve has failed in such a way that the third spool is obstructing the first port, thus allowing the second biasing member to shift the second valve stem in the first direction, such that the sixth port is in fluid communication with the seventh port.

8. A hydraulic control circuit for a hybrid powertrain comprising:
a first pressure regulating valve comprising:
a first port, a second port, a third port, a fourth port, and a fifth port in fluid communication with a first internal first bore, and
a first valve stem having a first spool, a second spool, and a third spool slidingly disposed within the first internal bore, wherein a first fluid chamber is defined between the first spool and the second spool, and a second fluid chamber is defined between the second spool and the third spool;
a second pressuring regulating valve comprising:
a sixth port, a seventh port, an eighth port, a ninth port, and a tenth port in fluid communication with a second internal bore, and
a second valve stem having a fourth spool, a fifth spool, and a sixth spool slidingly disposed within the second internal bore, wherein a third fluid chamber is defined between the fourth spool and the fifth spool, and a fourth fluid chamber is defined between the fifth spool and the sixth spool;
a shift valve comprising:
an eleventh port, a twelfth port, a thirteenth port, and a fourteenth port in fluid communication with a third internal bore, and
a third valve stem having a seventh spool and an eighth spool slidingly disposed within the third internal bore, wherein a fifth fluid chamber is defined between the seventh spool and the eighth spool;
a two-way check valve comprising a fifteenth port, a sixteenth port, and a seventeenth port, wherein the two-way check valve is operable to selectively seal one of the fifteenth port and the sixteenth port, thus selectively providing hydraulic communication between the fifteenth port with the seventeenth port, and between the sixteenth port with the seventeenth port; and
a network of hydraulic pathways interconnecting the first pressure regulating valve, the second regulating valve, the shift valve, and the two-way check valve.

9. The hydraulic control circuit of claim 8, wherein the network of hydraulic pathways includes:
a first fluid pathway configured to provide hydraulic communications between a source of pressured hydraulic fluid and the first port of the first pressure regulating valve, the fourteenth port of the shift valve, and the sixth port of the second pressure regulating valve;
a second fluid pathway configured to provide hydraulic communication between a hydraulic actuator and the eleventh port of the shift valve;
a third fluid pathway configured to provide hydraulic communication between a cooling circuit, the sixteenth port of the two-way check valve, and the seventh port and sixth port of the second pressure regulating valve;
a fourth fluid pathway configured to provide hydraulic communication between the second port of the first pressure regulating valve, the twelfth port of the shift valve, and the fifteenth port of the 2-way check valve; and
a fifth fluid pathway configured to provide hydraulic communication between the third port of the first pressure regulating valve and the tenth port of the second pressure regulating valve.

10. The hydraulic control circuit of claim 9, wherein the first pressure regulating valve further comprises:
a first biasing member is disposed within the first internal bore urging the first valve stem in a first direction, such that the first port is in fluid communication with the second port and third port; and a first electro-mechanical actuator disposed against the third spool for selectively urging the first valve stem in a second direction opposite the first direction by overcoming the first biasing member, such that the first port is obstructed by the third spool, wherein the first electro-mechanical actuator includes a first solenoid configured to apply a linear force proportion to an applied current.

11. The hydraulic control circuit of claim 9, wherein the second pressure regulating valve further comprises:

a second biasing member disposed within the second bore urging the second valve stem in a first direction, such that the sixth port is in fluid communication with the seventh port; and a second electro-mechanical actuator disposed against the sixth spool for selectively urging the second valve stem in a second direction opposite the first direction by overcoming the second biasing member, such that the sixth port is obstructed by the sixth spool, wherein the second electro-mechanical actuator is configured to not urge the second valve stem in the second direction when the first pressure regulating valve fails in such a way that the first port is obstructed by the third spool.

12. The hydraulic control circuit of claim 9, wherein:

the first spool includes a first surface area A1 in communication with first fluid chamber and the second spool includes a second surface area A2 in fluid communication with the first chamber, wherein the second surface area A2 is less than the first surface area A1 of the first spool; and the fourth spool includes a third surface area A3 in communication with third fluid chamber and the fifth spool includes a fourth surface area A4 in fluid communication with the third fluid chamber, wherein the fourth surface area A4 is less than the third surface area A3 of the fourth spool.

13. A hydraulic control circuit for a hybrid powertrain comprising:

a first pressure regulating valve comprising:
a first port, a second port, a third port, a fourth port, and a fifth port in fluid communication with a first internal first bore, and
a first valve stem having a first spool, a second spool, and a third spool slidingly disposed within the first internal bore, wherein a first fluid chamber is defined between the first spool and the second spool, and a second fluid chamber is defined between the second spool and the third spool;

a second pressuring regulating valve comprising:
a sixth port, a seventh port, an eighth port, a ninth port, and a tenth port in fluid communication with a second internal bore, and
a second valve stem having a fourth spool, a fifth spool, and a sixth spool slidingly disposed within the second internal bore, wherein a third fluid chamber is defined between the fourth spool and the fifth spool, and a fourth fluid chamber is defined between the fifth spool and the sixth spool;

a shift valve comprising:
an eleventh port, a tenth port, a thirteenth port, a fourteenth port, and an eighteenth port in fluid communication with a third internal bore, and a third valve stem having a seventh spool and an eighth spool slidingly disposed within the third internal bore, wherein a fifth fluid chamber is defined between the seventh spool and the eighth spool;

a one-way check valve comprising an inlet port and an outlet port, wherein the one-way check valve is operable to selectively provide hydraulic communication between the first pressure regulating valve and both the shift valve and second pressure regulating valve; and a network of hydraulic pathways interconnecting the first pressure regulating valve, the second regulating valve, the shift valve, and the one-way check valve.

14. The hydraulic control circuit of claim 13, wherein the network of hydraulic pathways includes:

a first fluid pathway configured to provide hydraulic communication between a source of pressurized hydraulic fluid and the first port of the first pressure regulating valve, the fourteenth port of the shift valve, and the sixth port of the second pressure regulating valve;

a second fluid pathway configured to provide hydraulic communication between a hydraulic piston actuator and the second port of the first pressure regulating valve;

a third fluid pathway configured to provide hydraulic communication between a cooling circuit, the seventh port and eighth port of the second pressure regulating valve, and the thirteenth port of the shift valve;

a fourth fluid pathway configured to provide hydraulic communication between the third port of the first pressure regulating valve and the eleventh port of the shift valve; and a fifth fluid pathway configured to provide hydraulic communication between the tenth port of the second pressure regulating valve, the outlet port of the one-way check valve, and a twelfth port and eighteenth port of the shift valve; and a sixth fluid pathway configured to provide hydraulic communication between the inlet port of the one-way check valve and the fifth port of the first pressure regulating valve;

wherein the fifth fluid pathway is in hydraulic communication with the sixth fluid pathway via an orifice.

15. The hydraulic control circuit of claim 14, wherein the one-way check valve is biased in a closed position thus hydraulically separating the sixth fluid pathway from the fifth fluid pathway and is configured to transition to an open position upon a predetermined pressure different between the fifth fluid pathway with the sixth fluid pathway, when a pressure within the sixth fluid pathway exceeds a predetermined pressure.

16. The hydraulic control circuit of claim 14, wherein the eight spool of the shift valve includes a fifth surface area A5 in fluid communication with the thirteenth port for selectively receiving a sufficient hydraulic fluid from the third fluid pathway to urge the third valve stem in a second direction, opposite the first direction, to overcome the third biasing member for providing fluid communication between the eleventh port and twelve port via the fifth fluid chamber.

17. The hydraulic control circuit of claim 13, wherein the second pressure regulating valve is configured to provide hydraulic communication between the sixth port and the seventh port via fourth fluid chamber upon the first pressure regulating valve failing in a predetermined mode.

* * * * *